(12) United States Patent
van Beek

(10) Patent No.: US 9,811,743 B2
(45) Date of Patent: Nov. 7, 2017

(54) TRACKING ROAD BOUNDARIES

(71) Applicant: Sharp Laboratories of America, Inc., Camas, WA (US)

(72) Inventor: Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 11 days.

(21) Appl. No.: 14/754,488

(22) Filed: Jun. 29, 2015

(65) Prior Publication Data
US 2016/0379064 A1    Dec. 29, 2016

(51) Int. Cl.
*G06K 9/00* (2006.01)
*G06K 9/46* (2006.01)

(52) U.S. Cl.
CPC ....... *G06K 9/00798* (2013.01); *G06K 9/4609* (2013.01); *G06K 9/4652* (2013.01); *G06T 2207/10004* (2013.01); *G06T 2207/20104* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 6,665,439 B1 | 12/2003 | Takahashi | |
| 7,636,455 B2 | 12/2009 | Keaton et al. | |
| 8,045,826 B2 | 10/2011 | Lukac | |
| 8,090,152 B2 | 1/2012 | Kageyama et al. | |
| 8,099,213 B2 | 1/2012 | Zhang et al. | |
| 8,462,988 B2 | 6/2013 | Boon | |
| 2005/0129279 A1* | 6/2005 | Unwin | G01J 3/50 382/104 |
| 2006/0078205 A1 | 4/2006 | Porikli et al. | |
| 2012/0294482 A1* | 11/2012 | Kasaoki | G06K 9/4647 382/103 |
| 2015/0371093 A1* | 12/2015 | Tamura | G06K 9/00798 382/103 |

OTHER PUBLICATIONS

Rasmussen, C., "Combining Laser Range, Color, and Texture Cues for Autonomous Road Following," Proceedings of the 2002 IEEE International Conference on Robotics and Automation (ICRA '02), May 11, 2002, Washington, D.C., 6 pages.

(Continued)

*Primary Examiner* — Atiba O Fitzpatrick
(74) *Attorney, Agent, or Firm* — Steven M. Reiss; ScienBiziP, P.C.

(57) ABSTRACT

Systems and methods of tracking a road boundary are provided. According to one aspect, a method of tracking a road boundary may include capturing an image from a camera, identifying a pair of regions of interest (ROI) in the image on each side of a candidate boundary position, extracting a color profile from each of the ROIs, generating a weighted color difference score by comparing the color profiles and weighting a difference between the color profiles based on a color similarity between colors in the color profiles, and outputting a determination of a detected boundary based upon the weighted color difference score.

19 Claims, 10 Drawing Sheets

(56) References Cited

OTHER PUBLICATIONS

Lipski, C. et al., "A Fast and Robust Approach to Lane Marking Detection and Lane Tracking," Proceedings of the 2008 IEEE Southwest Symposium on Image Analysis and Interpretation (SSIAI '08), Mar. 24, 2008, Santa Fe, New Mexico, 4 pages.

Kong, H. et al., "General Road Detection From a Single Image," IEEE Transactions on Image Processing, vol. 19, No. 8, Aug. 2010, 10 pages.

Zhao, Y. et al., "Unstructured Road Edge Detection and Initial Positioning Approach based on Monocular Vision," AASRI Procedia, vol. 1, Available as Early as Jan. 1, 2012, 6 pages.

Fritsch, J. et al., "Monocular Road Terrain Detection by Combining Visual and Spatial Information," IEEE Transactions on Intelligent Transportation Systems, vol. 15, No. 4, Aug. 2014, 12 pages.

Koschan, A. et al., "Detection and Classification of Edges in Color Images," IEEE Signal Processing Magazine, vol. 22, No. 1, Jan. 2005, 10 pages.

Blas, M. et al., "Fast Color/Texture Segmentation for Outdoor Robots," 2008 IEEE/RSJ International Conference on Intelligent Robots and Systems, Sep. 2008, 8 pages.

Rasmussen, C. et al., "Appearance Contrast for Fast, Robust Trail-Following," 2009 IEEE/RSJ International Conference on Intelligent Robots and Systems, Oct. 2009, 8 pages.

Kuhnl, T. et al., "Monocular Road Segmentation using Slow Feature Analysis," 2011 IEEE Intelligent Vehicles Symposium (IV), Jun. 2011, 7 pages.

Dinh, C. et al., "SEDMI: Saliency Based Edge Detection in Multispectral Images," Image and Vision Computing, vol. 29, No. 8, Jul. 2011, 11 pages.

Kuhnl, T. et al., "Spatial Ray Features for Real-Time Ego-Lane Extraction," 15th International IEEE Conference on Intelligent Transportation Systems (ITSC), Sep. 2012, 6 pages.

Chang, C. et al., "Mobile Robot Monocular Vision Navigation Based on Road Region and Boundary Estimation," 2012 IEEE/RSJ International Conference on Intelligent Robots and Systems, Oct. 2012, 8 pages.

Siagian, C. et al., "Mobile Robot Navigation System in Outdoor Pedestrian Environment Using Vision-Based Road Recognition," 2013 IEEE International Conference on Robotics and Automation, May 2013, 8 pages.

Satzoda, R. et al., "Selective Salient Feature based Lane Analysis," 16th International IEEE Annual Conference on Intelligent Transportation Systems, Oct. 2013, 6 pages.

\* cited by examiner

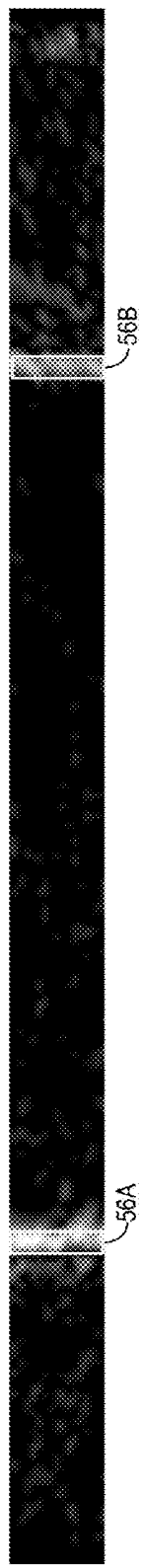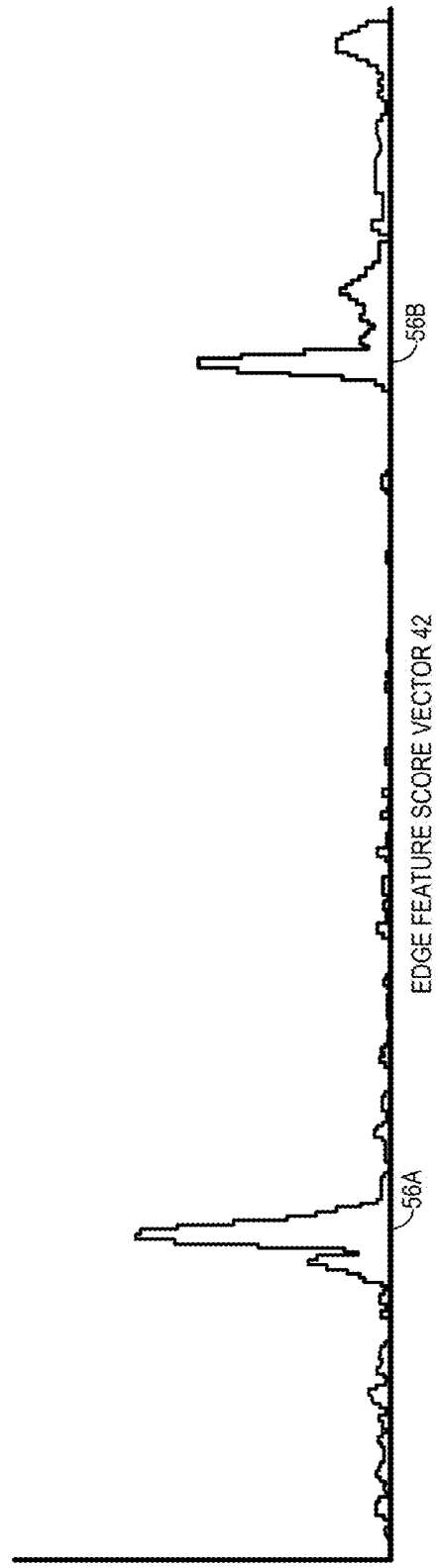
FIG. 5A
FIG. 5B

WIEGHTED COLOR DIFFERENCE SCORE VECTOR 44

EDGE FEATURE SCORE VECTOR 42

WIEGHTED COLOR DIFFERENCE SCORE VECTOR 44

COMBINED SCORE VECTOR 45

TRACKING ROAD BOUNDARIES

BACKGROUND

Detecting and tracking the condition of a road, lane, or trail is a challenge in developing intelligent driver safety systems (IDSS) and advanced driver assistance systems (ADAS), as well as in robotic unmanned ground vehicles (UGVs). Prior approaches have had particular difficulty detecting edges of such roads, lanes, and trails when their edges are imprecise or not well defined. Failure to correctly determine such an edge in these types of systems may lead to degraded performance, incorrect navigation, or unplanned departure from the road, lane, or trail.

SUMMARY

Systems and methods of tracking a road boundary are provided. According to one aspect, a method of tracking a road boundary may include capturing an image from a camera, identifying a pair of regions of interest (ROI) in the image on each side of a candidate boundary position, extracting a color profile from each of the ROIs, generating a weighted color difference score by comparing the color profiles and weighting a difference between the color profiles based on a color similarity between colors in the color profiles, and outputting a determination of a detected boundary based upon the weighted color difference score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A shows an example edge feature filter response image for a region of interest of FIG. 4.

FIG. 5B shows an example edge feature score vector for the edge feature filter response image of FIG. 5A.

DETAILED DESCRIPTION

Embodiments of a road boundary tracking system will now be described. These embodiments address the challenges discussed briefly above of accurately determining the boundaries of a road, lane, or trail, and may be of use in applications such as intelligent driver safety systems (IDSS) and advanced driver assistance systems (ADAS), as well as for robotic unmanned ground vehicles (UGVs). Example use case scenarios of the road boundary tracking systems and methods described herein include but are not limited to autonomous vehicle navigation, road mapping via a camera-equipped vehicle, lane detection on multi-lane roads, and navigation and mapping of unpaved roads with softly defined edges.

Figure 1:
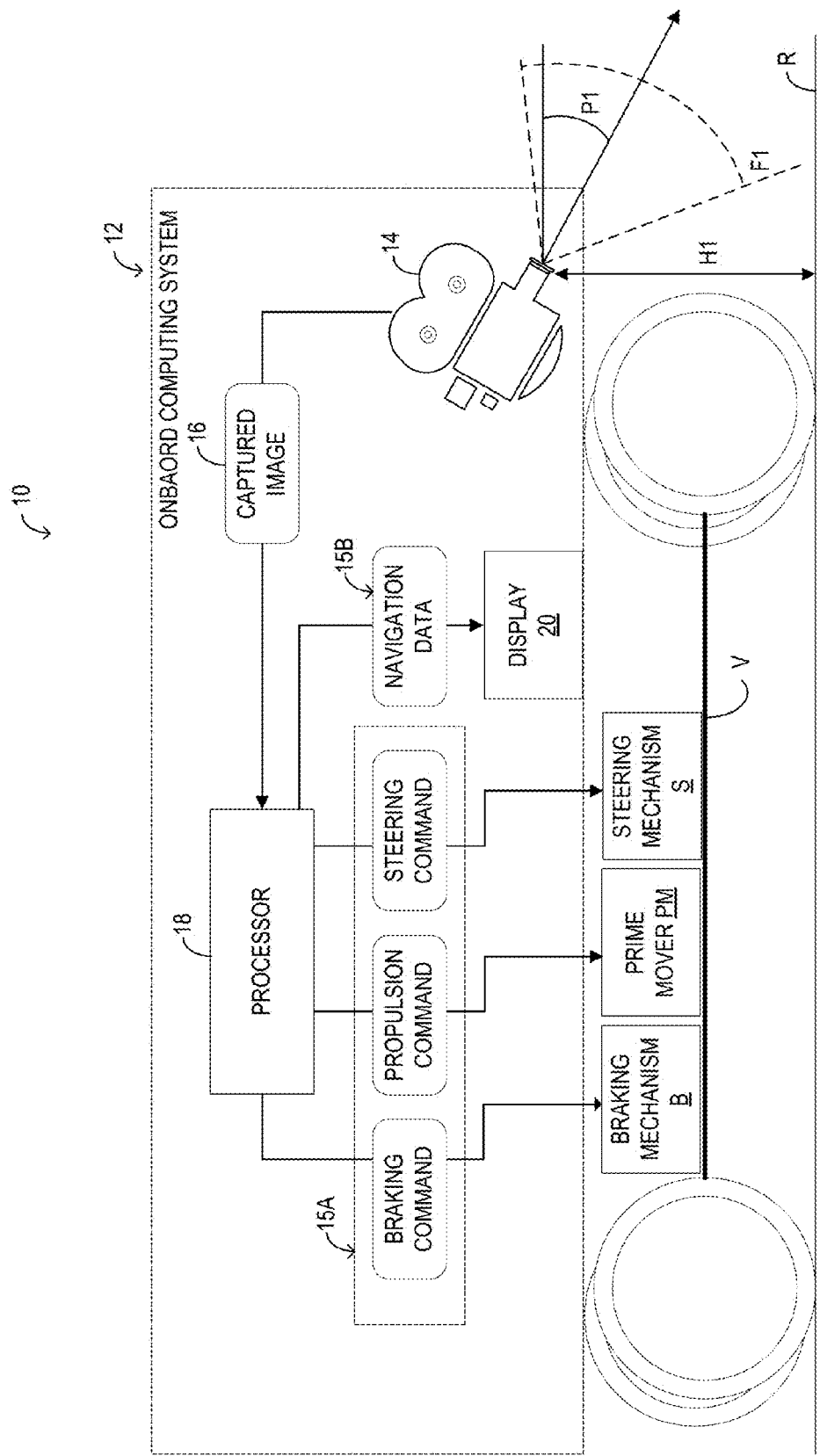
FIG. 1 shows an example embodiment of a road boundary tracking system of the present description.

FIG. 1 illustrates a road boundary tracking system 10 that includes an onboard computing system 12 mounted to a chassis of a vehicle V. The onboard computing system 12 includes a camera 14 for capturing an image 16 and a processor 18 configured to receive the image 16 from the camera 14. Although vehicle V is illustrated as a four wheeled vehicle, it will be appreciated that vehicle V may alternatively have another number of wheels, or may be configured to walk on legs, or may be outfitted with other types of traction systems, such as tracks, rollers, etc. The vehicle may be an unmanned vehicle, or a manned vehicle, and may be configured to be driven by a person, or may drive autonomously. The vehicle may alternatively be referred to as a robot, in some scenarios. While both the camera 14 and processor 18 are illustrated as being located onboard the vehicle V, it will be appreciated that the camera 14 may be onboard the vehicle V, and configured to communicate images to an offboard processor for image processing, if desired. It will also be appreciated that processor 18 may be a distributed processing system formed of an onboard processor and associated onboard memory and an offboard processor and associated offboard memory.

The vehicle may include a prime mover PM, such as an internal combustion engine or electric motor, to propel the vehicle V, a steering mechanism S to steer the vehicle V, and a braking mechanism B to brake the vehicle V. The processor 18 of the onboard computing system 12 may be configured to send commands to control movement of the vehicle V along a target route. For example, the onboard computing system 12 may send driving commands 15A, which may include a braking command, a propulsion command, and/or a steering command, to the braking mechanism B, prime mover PM, and steering mechanism S respectively to drive the vehicle V along a road R. Concurrently or alternatively to the driving commands 15A, the processor 18 may output navigation data 15B. The navigation data 15B may be stored in memory, and/or may be displayed on an onboard display 20 and used as part of a navigation aid system for a user of the vehicle V. It will be appreciated that if the vehicle V is not configured for autonomous driving, then the processor 18 may be configured to only output navigation data 15B for onboard or offboard storage in a nonvolatile storage device, and not output navigation commands 15A. In one such example configuration used in mapping applications, the detected boundaries of the road R are compiled and stored in memory as navigation data 15B.

It will be appreciated that the road R is not limited to paved roads or roads designed for vehicles, and thus may be any suitable surface used for travel, such as a street, trail, or path. Often, the road is planar, however, sloping or uneven roads may also be used. As some non-limiting examples, the road R may be an indoor concrete path on a factory floor, a path on a tile floor in a hospital, a dirt hiking trail through a forest, a gravel jogging path through a park, a paved public road, or other suitable road.

As illustrated in FIG. 1, the camera 14 is positioned onboard the vehicle V. The camera 14 is positioned on the vehicle V at a fixed predetermined height H1 and angular orientation relative to horizontal (i.e., relative to the road R) which is indicated as Pitch P1, and may also include roll and yaw values. Accordingly, there is a predetermined relation between the camera 14 coordinate system and the ground plane that defines the surface of the road R in FIG. 1. A field of view F1 of the camera captures a portion of the surface of the road R from a perspective that is dependent upon by this predetermined relation. Other factors that determine the camera perspective include camera intrinsic properties such as focal length, which also may be stored in memory and used to compute the camera field of view F1.

Figure 2:
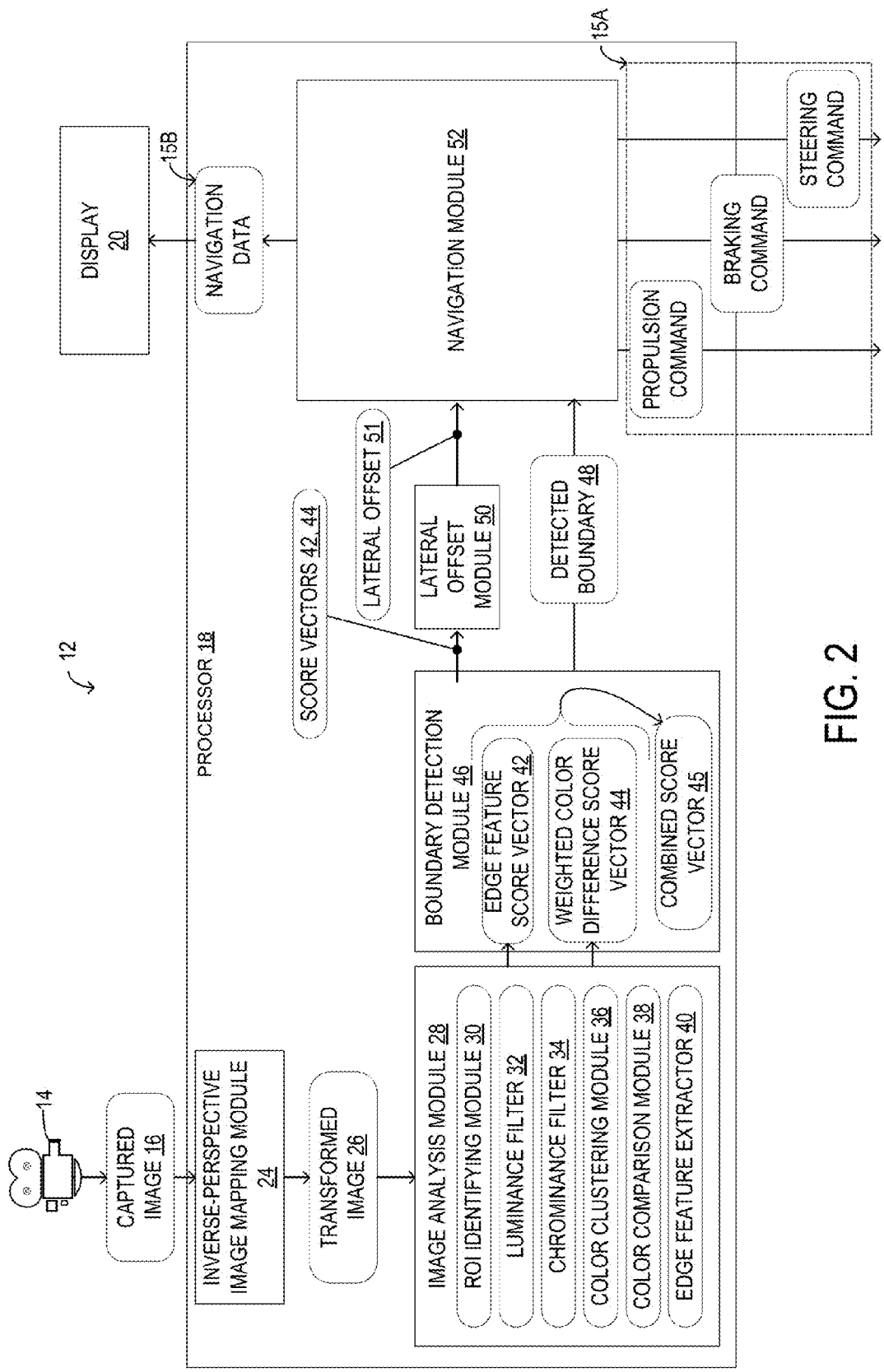
FIG. 2 shows an onboard computing system of the road boundary tracking system of FIG. 1.

FIG. 2 illustrates a software and hardware architecture diagram of the onboard computing system 12. The camera 14 captures an image, and the captured image 16 is sent to an inverse-perspective image mapping module 24 executed by the processor 18 of the onboard computing system 12. The inverse-perspective image mapping module 24 transforms the captured image 16, which contains a perspective view of the road, into a transformed image 26, which is a "bird's eye view" or top-down view of the road. The inverse-perspective image mapping operation performed by the inverse-perspective image mapping module 24 may be based on the predetermined relation between the camera 14 and the road R, as well as stored camera intrinsic properties such as focal length.

The transformed image 26 is sent to an image analysis module 28 executed by the processor 18 of the onboard computing system 12. The image analysis module 28 may include a region of interest (ROI) identifying module 30, a luminance filter 32, a chrominance filter 34, a color clustering module 36, a color comparison module 38, and an edge feature extractor 40. The ROI identifying module 30 may be configured to identify regions of interest in the transformed image 26 on which to perform further image analysis. The luminance filter 32 converts pixel colors of the transformed image 26 to grayscale or luminance values. It is understood that the luminance filter can convert pixel colors to any suitable dimension of color, not limited to grayscale or luminance. As an example, the filter may convert pixel colors to a dimension that is less sensitive to shadows or a dimension that is invariant to illumination. After processing by the luminance filter 32, the grayscale transformed image 26 is analyzed by the edge feature extractor 40, which is a horizontal differential filter that responds to wide edges in the pixel grayscale or luminance values, and an edge feature score vector 42 for the transformed image is extracted, as explained in more detail below.

The transformed image 26 may also be processed by the chrominance filter 34 and the color clustering module 36, such that the RGB color values of pixels in the ROI of the transformed image 26 are mapped to a color space that has improved perceptual uniformity. After further processing by the color comparison module 38, a weighted color difference profile, which in one example may be a weighted color difference score vector 44, for the ROI of the transformed image 26 may be determined, as explained in more detail below.

The edge feature score vector 42 may include edge feature scores for candidate boundary positions along an ROI of the transformed image 26. The weighted color difference score vector 44 may include color feature scores for candidate boundary positions along the ROI of the transformed image 26. After processing the transformed image 26, the edge feature score vector 42 and the weighted color difference score vector 44 are sent to a boundary detection module 46 executed by the processor 18. The boundary detection module 46 normalizes the score vectors of both the edge feature score vector 42 and the weighted color difference score vector 44, and combines the normalized score vectors into a single combined score vector 45. The combined score vector 45 represents a likelihood of observing a road boundary at each candidate boundary position along the ROI of the transformed image 26. Based on the combined score vector 45, the boundary detection module outputs a detected boundary 48 to the navigation module 50. In some embodiments, edge feature detection may be omitted and the boundary detection module may output the detected boundary based on the weighted color difference score vector 44.

The detected boundary 48 may be sent to a lateral offset module 50 executed by the processor 18. The lateral offset module 50 may be configured to estimate a lateral offset 51 of the position of the camera 14 relative to the position of the camera 14 on the road R at an earlier time instant during the boundary tracking process, based on the predetermined relation between the camera 14 and the road R, and the detected boundary 48. The lateral offset 51 may be transmitted from the lateral offset module 50 to the navigation module 52 for use in autonomous navigation. Additionally, this lateral offset 51 of the camera position may be utilized to detect and track the road at subsequent time instances. For example, the lateral offset 51 may be used to restrict the search space for road boundaries in subsequent images captured by the camera, and thus may be fed back to the boundary detection module 46 if desired. In an autonomous vehicle embodiment, the processor is further configured to execute a navigation module 52 to receive the output and control travel of the vehicle based upon the output. For example, the detected boundary 48 is sent as output to the navigation module 52 executed by the processor 18. The navigation module 52 may be configured to send navigation commands 15A to the vehicle V based on the detected boundary 48, in order to navigate the vehicle V on the road R, such that the vehicle remains inside the detected boundary 48 of the road R.

In a non-autonomous vehicle embodiment, the navigation module 52 may be configured to not send the navigation commands 15A. In this embodiment, the navigation module 52 may store the detected boundary 48 as a part of the navigation data 15B. The navigation data 15B may be utilized as part of a navigation aid system, or be stored and uploaded to a server, as road data for a mapping application for example.

Figure 3:
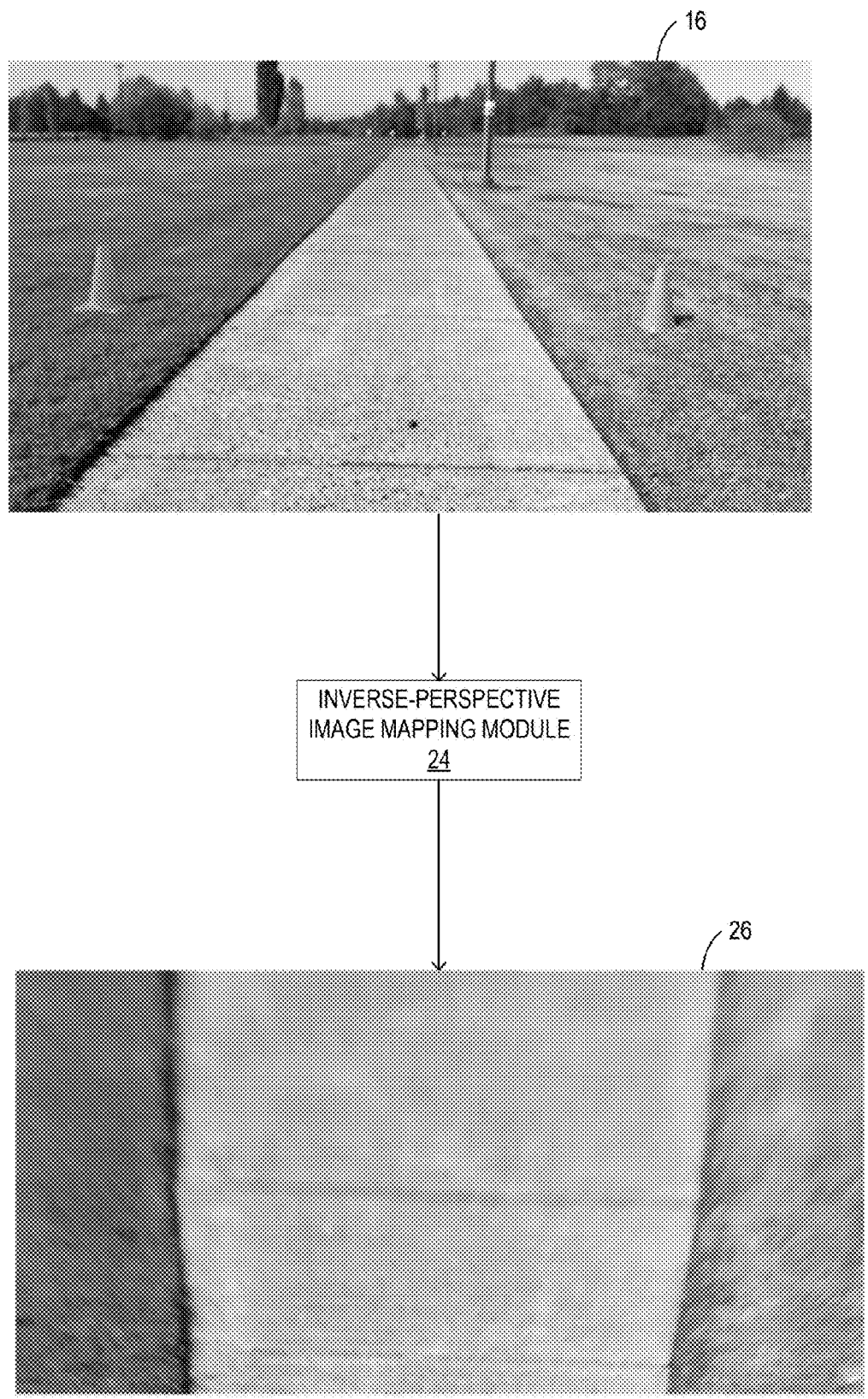
FIG. 3 shows an image captured by the camera of FIG. 1.

Now turning to FIG. 3, an example captured image 16 is shown. As discussed above, the captured image 16 is captured by the camera 14, which has a predetermined relation with the ground plane, which includes road R. In one example, the predetermined relation may be input by a user during a calibration step by inputting four points in the image that define two parallel lines, such as the edges of road R. In another example the height H1 and angular orientation are input. Based on this relation and stored intrinsic camera properties such as focal length, the inverse-perspective image mapping module 24 may be configured to transform the captured image 16 into the transformed image 26, which is a top-down or "bird's eye view" of a portion of the captured image 16. Although shown in grayscale in the Figures, it will be appreciated that captured image 16 is a color image, typically.

It will be appreciated that in the top-down view of the transformed image 26, a relatively straight road includes road boundaries that appear as vertical lines. Such a top-down representation simplifies further image processing, and prepares the image for the application of further image processing techniques. Accordingly, the road boundary tracking system may be configured to track generally vertically oriented boundaries in the transformed image 26 formed in the left and right of the image. To find these road boundaries, the road boundary tracking system may be further configured to inspect regions of interest (ROIs) corresponding to horizontal bands across the transformed image 26, and search for the left and right edges in each horizontal band, as discussed below.

Figure 4:
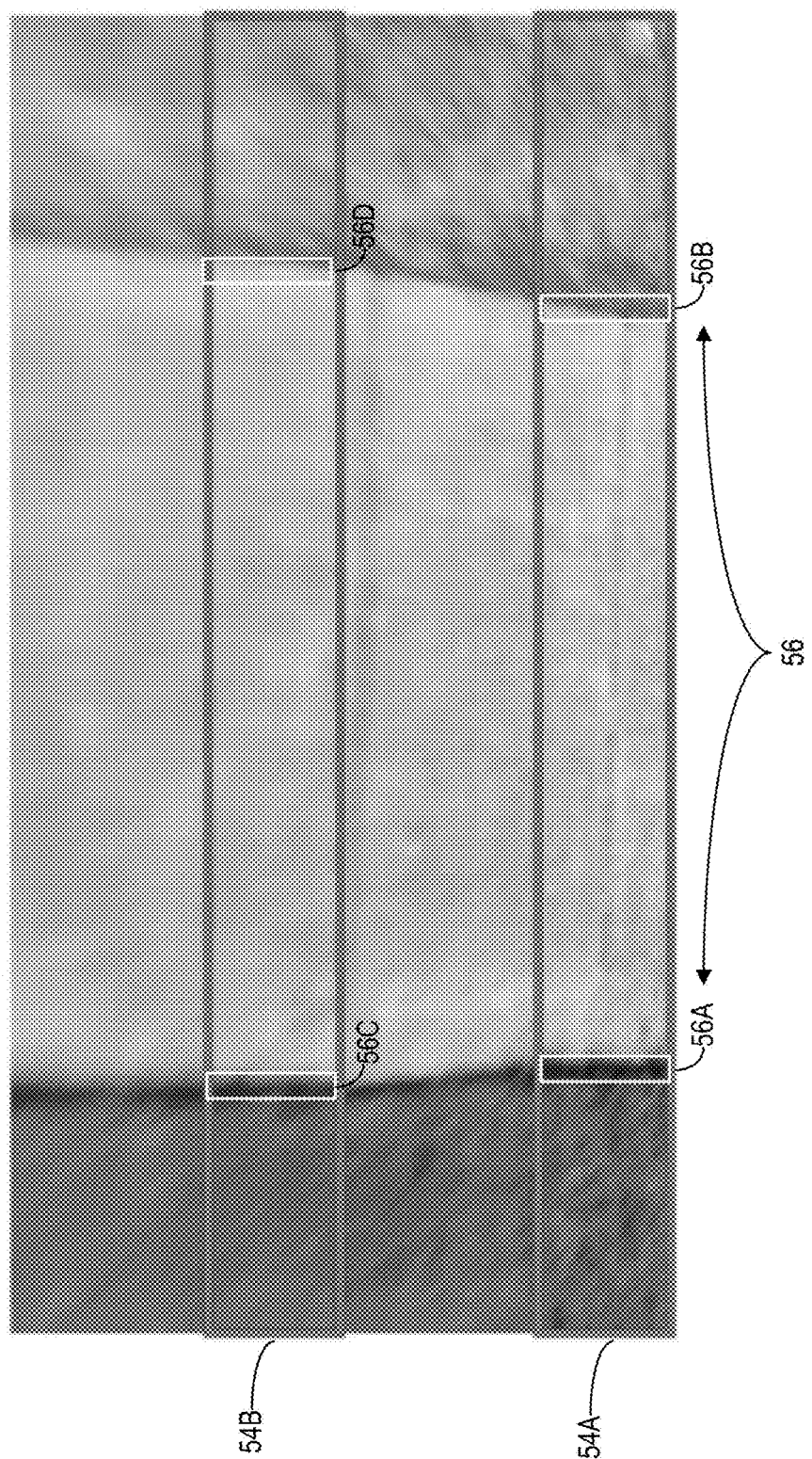
FIG. 4 shows two regions of interest for the image captured by the camera of FIG. 1.

FIG. 4 illustrates a first region of interest 54A and a second region of interest 54B in the transformed image 26 that are selected by the region of interest identifying module 30. It will be appreciated that although two regions of interest are illustrated, any number of regions of interest may be selected by the ROI identifying module 30. In the example illustrated in FIG. 4, the ROI identifying module 30 may select the first region of interest 54A based on any suitable criteria. For example, the ROI identifying module 30 may select a region of interest at the bottom of the transformed image 26, which corresponds to the region of the transformed image 26 that is nearest to the vehicle 18. The second region of interest 54B may be selected to be a suitable distance away from the first region of interest 54A, however it will be appreciated that other suitable criteria may be used to select the second region of interest 54B, and any proceeding regions of interest.

As illustrated in FIG. 4, the first and second regions of interest may take the form of a horizontal band that spans the width of the transformed image 26. However, the first and second region of interest may take another form based on a suitable criteria. The width and height of the first and second region of interest may be selected in order to achieve a suitable robustness of the boundary detecting method while minimizing the total area that needs to be processed. For example, the region of interest may have a height of one pixel in order to minimize computations, however it will be appreciated that the height and width may encompass any suitable number of pixels.

After selecting a region of interest, one or more candidate boundary positions may be identified for the region of interest. For example, as illustrated in FIG. 4, a candidate boundary position 56 may be identified for the first region of interest 54A. While the illustrated example shows the candidate boundary position 56 as including a plurality of pixels, it will be appreciated that the candidate boundary position may include any number of pixels, such as one pixel. Additionally, although one candidate boundary position is illustrated, any number of suitable candidate boundary positions may be considered. For example, every pixel along the bottom row of the first region of interest 54A may identified as a candidate boundary position, in an iterative loop scanning each pixel from left to right across the row in the image. As another example, the candidate boundary position 56 may be a group of pixels, and every consecutive group of pixels along the bottom row of the first region of interest 54A may be identified as a candidate boundary position. Typically, pixels spanning the entire height of the region of interest 54A are considered as the boundary candidate position, so if the region of interest 54A has a height of 20 pixels, then the candidate boundary position typically also has that height. For this reason, the illustrated candidate boundary position 56 is a narrow rectangle spanning the entire height of the first region of interest 54A.

Now turning to FIG. 5A, the first region of interest 54A of the transformed image 26 may be further processed by the luminance filter 32 executed by the processor 18. The luminance filter 32 may be configured to convert the input pixel color values of the first region of interest 54A, which are typically color values, to grayscale or luminance values. The converted region of interest may then be processed by the edge feature extractor 40 to extract an edge feature at a candidate boundary position from the image. Additionally, the edge feature is extracted based upon grayscale information of a part of the image that contains the ROIs.

For example, the edge feature extractor 40 may be configured to process the converted region of interest with a horizontal differential filter that responds to wide edges (e.g., between 10 and 100 pixels wide) in the pixel grayscale or luminance values in the horizontal direction. As one specific example, assuming the region of interest is a 2D array of rows and columns of pixels, the horizontal differential filter may produce a difference in luminosity of a target pixel in the region of interest and a pixel located in the same row 9 pixels to the left. As another example, the horizontal differential filter may produce a result value based on multiple pixel values to the left of a candidate boundary position and multiple pixel values to the right of a candidate boundary position. The horizontal differential filter may then filter the result by a first, lower threshold and ignore those values, setting them to zero, and may also filter the result by second higher cutoff threshold, such that any value above that threshold is rewritten to be the cutoff threshold value.

FIG. 5A illustrates an example of an edge feature filter response image of the first region of interest 54A illustrated in FIG. 4, resulting from processing of the grayscale or luminance value converted region of interest 54A by edge feature extractor 40. Values in between the first, lower threshold, and the higher, cutoff threshold are mapped to each pixel for which they were computed, to generate the image of FIG. 5A. Thus, black pixels represent zero, white pixels represent the second, higher cutoff, and gray pixels represent the luminosity difference for pixels for which the filter computed a luminosity difference between the two thresholds. Since small grayscale or luminosity differences (i.e., below the first, lower threshold) were filtered out prior to generating the image, the image is relatively noise free. Likewise, since large filter responses are detected using the second threshold and clipped to a given maximum value, strong filter response beyond the second threshold are all considered to be equally significant and contribute to the final edge feature score in an equal manner. It will be appreciated that the first and second threshold may be selected as any suitable values. For example, the lower, first threshold may be 5% of the range of possible values, and the larger, second threshold may be any value over 20% of the range of possible values.

The edge feature extractor 40 may be further configured to compute an edge feature score based on the edge feature filter response image. In one embodiment, an edge feature score may be computed for each candidate boundary position along the edge feature filter response image. For example, each pixel in the bottom row of the edge feature filter response image may be considered as a candidate boundary position, and the edge feature score of each candidate boundary position may be computed by accumulating the filter responses vertically in the column for each row position.

FIG. 5B illustrates example edge feature scores after accumulating the filter responses vertically. As illustrated, the horizontal axis may be the candidate boundary positions (e.g., each pixel in a lowermost row of the image of FIG. 5A) corresponding to the edge feature filter response image, and the vertical axis may be an accumulated value of filter responses for each candidate boundary position, e.g., the sum of the luminosity or grayscale difference values for each pixel in the same column as the pixel in the candidate boundary position. Accordingly, peaks in the edge feature score correspond to potential boundaries in the region of interest of the transformed image 26. In the example illustrated in FIG. 5B, as the candidate boundary position 56A has a high edge feature score, the candidate boundary position 56A has a high likelihood of corresponding to a road boundary in the first region of interest 54A, and likewise with candidate boundary position 56B.

Figure 6A:
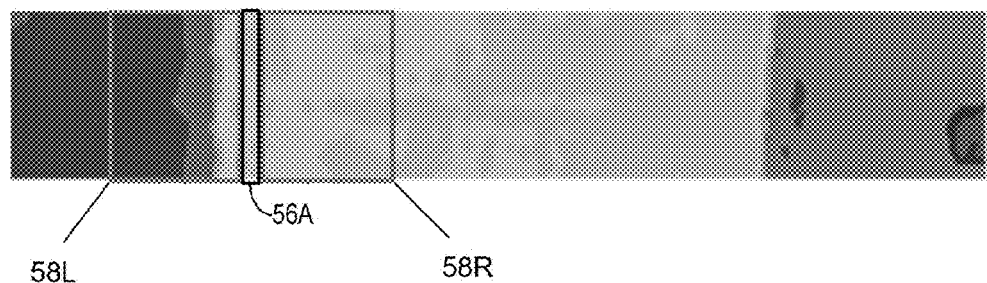
FIG. 6A shows a candidate boundary position and a pair of regions of interest for the image captured by the camera of FIG. 1.

Now turning to FIG. 6A, an example of color segmentation by k-means clustering is illustrated. It will be appreciated that the image in FIG. 6A, although shown in grayscale, is typically in color. Concurrently or alternatively to the extraction of the edge feature discussed above, the processor 18 is further configured to identify a pair of regions of interest (ROI) in the image on each side of the candidate boundary position. For example, the ROI identifying module 30 may be configured to select a left ROI 58L and a right ROI 58R, such that the left ROI 58L contains a group of pixels to the left of the candidate boundary position 56A and the right ROI 58R contains a second group of pixels to the right of the candidate boundary position 56A. It will be appreciated that the left ROI 58L and the right ROI 58R may be configured to contain any suitable number of pixels.

Processor 18 may be further configured to extract a color profile from each of the ROIs. That is, the image analysis module 28 may extract a color profile from the left ROI 58L and the right ROI 58R for each candidate boundary position. As discussed above, the image analysis module 28 may be configured to successively analyze a plurality of candidate boundary positions, distributed horizontally across the first region of interest 54A of the transformed image 26, for example, by scanning each pixel in the lowermost row as a candidate boundary position. As discussed above, the candidate boundary positions may contain one or more pixels, and typically are one or more pixels wide and extend vertically the entire height of the image in FIG. 6A. For ease of processing, candidate boundary positions analyzed with color analysis on the image of FIG. 6A are typically located at the same position as candidate boundary positions that are analyzed on the grayscale or luminance image of FIG. 5A, so that the score from each analysis may be combined for each candidate boundary position, and an edge determination made.

In one embodiment, extracting the color profile includes clustering the colors in the pair of ROIs. In the example illustrated in FIG. 6A, the color clustering module 36 executed by the processor 18 may be configured to cluster the colors in the left ROI 58L and the right ROI 58R for the candidate boundary position 56A. For computational efficiency, this and other color clustering steps described herein, may be accomplished by performing color clustering on the entire image first, and then for the smaller segments of the image that define the ROIs to be examined, in this case the left ROI 58L and right ROI 58R, the distribution of the already clustered colors within the bounds of these smaller ROIs can be computed efficiently. This process may be repeated for each candidate boundary position in the first region of interest 54A. In this embodiment, the pair of ROIs of the captured image each include a plurality of segments, each segment having an associated luminance value and chrominance value. For example, each segment of the plurality of segments may be a group of pixels in the left ROI 58L or the right ROI 58R. The group of pixels in each segment may be selected based on a variety of criteria. In one specific example, each pixel in the left ROI 58L or the right ROI 58R that has a specific luminance value and chrominance value may be grouped together into the same segment in a technique referred to as binning or clustering, such that each segment is associated with different luminance and chrominance values, and each segment contains a group of pixels having that segment's associated luminance and chrominance values. As another non-limiting example, each segment may contain pixels from a specific location in the left or right ROIs, and the associated luminance value and chrominance value for that segment may be based on an average or mean of the luminance values and chrominance values of the group of pixels for that segment. It will be appreciated that each segment may contain any suitable number of pixels from the pair of ROIs, such as one pixel.

Further in this embodiment, clustering the colors includes, for each segment in the plurality of segments, classifying the segment according to its chrominance value into one of a plurality of chrominance ranges. The color clustering module 36 executed by the processor 18 may cluster the colors using a variety of methods. In one example, RGB color values of pixels or segments in the pair of ROIs are mapped to a color space that has improved perceptual uniformity, such as the CIE-Lab, CIE-Luv, HSV, or YCRCB space. The YCC color space is preferred as the mapping has lower computational cost. In the YCC space, the luminance (Y) component can be down-weighted relative to the chrominance components (CR and CB), to reduce sensitivity to illumination and shadows and to emphasize actual color differences. Next, the transformed pixel color values are clustered into a small number of color clusters, such as eight color clusters in one non-limiting example, using K-means clustering. Each pixel or segment is thereafter represented by the color value of its associated cluster center (e.g., a YCC color value). This stage results in a compact and noise-robust description of the color information in the image.

Additionally, K-means clustering is an iterative process that starts with a set of initial cluster centers and repeatedly improves the calculated centers based on all data received to that point. The clustering process for a given frame is initialized with K-means cluster labels determined in a previous frame. This can result in more stable color descriptors over time and better boundary tracking.

In this embodiment, a left color profile is extracted for the left ROI 58L and a right color profile is extracted for the right ROI 58R. It will be appreciated that the pair of ROIs illustrated in FIG. 6A are the pair of ROIs for the candidate boundary position 56A. Accordingly, there will be a plurality of pairs of ROIs, one pair for each candidate boundary position in the plurality of candidate boundary positions that span horizontally across the first ROI 54A, the second ROI 54B, and any subsequent ROIs in the transformed image 26. Thus, there will be a plurality of color profiles that are extracted.

Additionally, each color profile includes or takes the form of a respective color histogram which represents the clustered colors in each ROI of the pair of ROIs for each candidate boundary position. The color histogram is a histogram of the color cluster labels discussed above. For example, if the color clustering method includes eight color clusters, then the histogram of the color cluster labels will include eight bins, and each pixel or segment within each ROI of the pair of ROIs will be labeled with a specific color cluster label from the eight color clusters. It will be appreciated that any suitable number of color clusters may be used in this clustering method. Thus, each ROI in the pair of ROIs for each candidate boundary position will have a respective color histogram, each color histogram binning each pixel or segment in the respective ROI into a bin for the associated color cluster label of that pixel or segment.

Next, the color comparison module 36 executed by the processor 18 may be configured to compare the color profiles of the left and right ROIs for each candidate boundary position. In one embodiment, the color comparison module 36 may be configured to generate a weighted color difference score vector by comparing the color profiles for each ROI in the pair of ROIs positioned on opposite sides of the candidate boundary position, and weighting a difference between the color profiles based on a color difference (i.e., color dissimilarity) between colors in the color profiles. In one specific example, a weighted color difference score between the two ROIs may be computed using a weighted quadratic distance metric, defined by:

$$((h_L - h_R)^T S (h_L - h_R))^{1/2}$$

In this example, hi, is the respective histogram for the left ROI 58L, $h_R$ is the respective histogram for the right ROI 58R, and S is a color similarity matrix. The weighted quadratic distance metric takes into account correlations of colors in different histogram bins, and reduces the effects of color quantization due to clustering. The color similarity matrix is a small pre-defined matrix, defined by:

$$S_{ij} = \exp\{-(c_i - c_j)^2 / Z\}$$

In this example, ci and cj are YCC triplet values for color cluster centers i and j, and Z is a constant. The use of the color similarity weights results in higher stability of boundary scores and better boundary detection and tracking. It will be appreciated that other metrics may be used to weight a difference between the color profiles based on a color similarity between colors in the color profiles. Further it will be appreciated that the similarity used for weighting may be represented as a color dissimilarity as well.

Figure 6B:
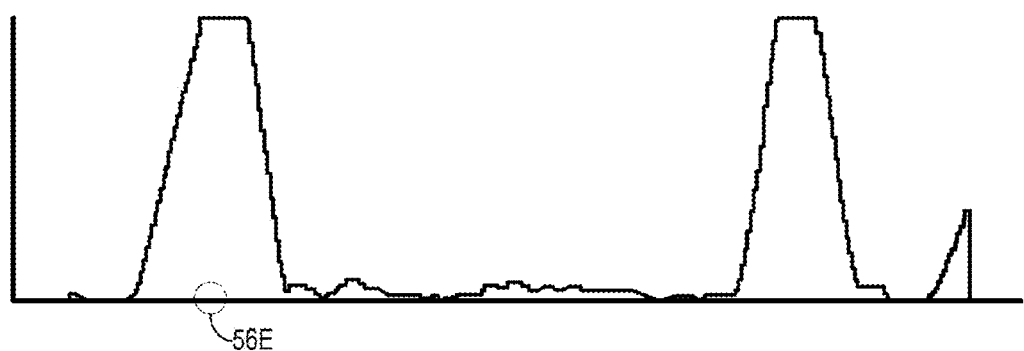
FIG. 6B shows an example weighted color difference score vector for the candidate boundary positions of 6A.

FIG. 6B illustrates an example of a weighted color difference profile, which is shown in the form of a weighted color difference score vector 44 comprised of weighted color difference scores computed as described above. Further, it will be appreciated that the term vector is used herein to mean a sequence container, such as an array, which contains the weighted color difference scores for the candidate boundaries at each position, although it will be appreciated that other types of data structures may be used to represent the weighted color difference profile. Below, the weighted difference score profile will be described with reference to the exemplary weighted color difference score vector 44. In the illustrated example in FIG. 6B, the x axis includes the candidate boundary positions, which may span horizontally across the first region of interest 54A for example. The y axis is a color feature score, specifically a weighted color difference score, which is based on the weighted color histogram dissimilarity that may be computed for each candidate boundary position and the respective pair of ROIs, as discussed above. In one embodiment, the detected boundary is determined by identifying a peak in the weighted color difference score vector. For example, in the weighted color difference score vector illustrated in FIG. 6B, which is the weighted color difference score vector for the first region of interest 54A, there is a peak corresponding to candidate boundary position 56E. Accordingly, the detected boundary may be determined based on the location of the candidate boundary position 56E in the first region of interest 54A of the transformed image 26. In another embodiment, the detected boundary is determined by filtering the combined score vector 45 (if edge scoring is used) or weighted color difference score vector (if edge scoring is not used) to remove values above a threshold prior to identifying peaks.

Figure 7:
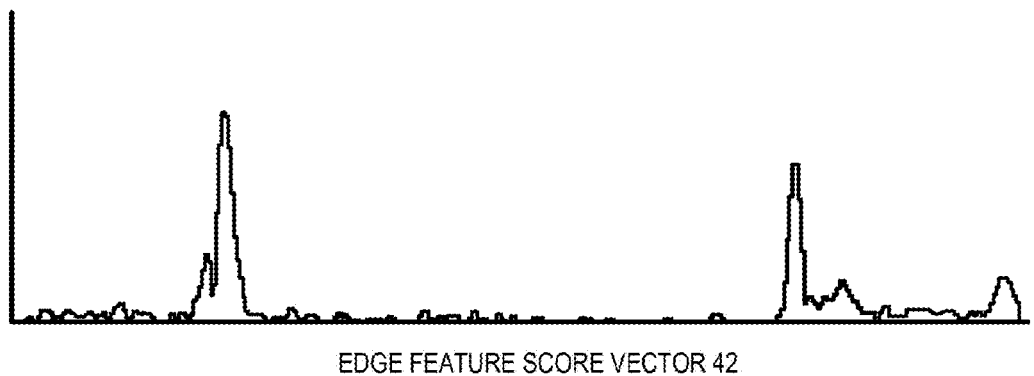
FIG. 7 shows an edge feature score vector for the edge feature scores of FIG. 5B, the weighted color difference score vector of FIG. 6B, and a combined score vector.
Figure 7:
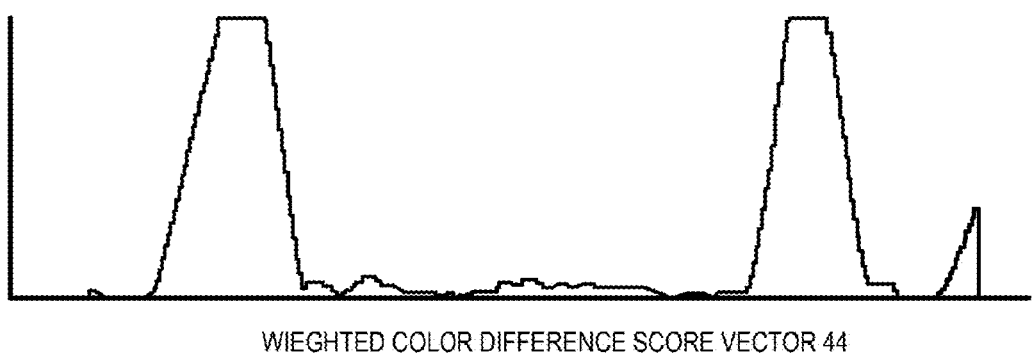
Figure 7:
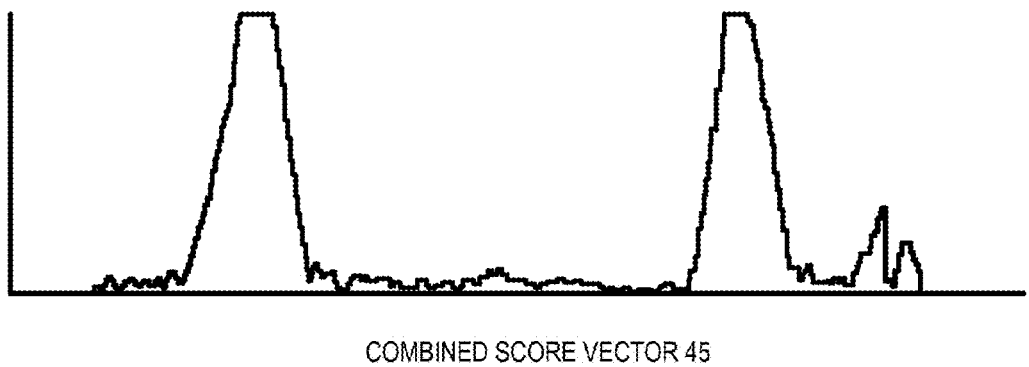

Now turning to FIG. 7, the scores for the edge feature score vector 42 and the weighted color difference score vector 44 may be sent to the boundary detection module 46 executed by the processor 18. In one embodiment, the boundary detection module 46 may be configured to output a determination of a detected boundary based upon the weighted color difference score vector and the extracted edge feature score vector. For example, the edge feature score vector 42 may include edge feature scores for all candidate boundary positions and the weighted color difference score vector 44 may include corresponding weighted color difference scores for all candidate boundary positions in the first region of interest 54A of the transformed image 26. Each score vector may be thresholded (i.e., cut off at a threshold) and normalized with respect to pre-defined maximum values.

Next, the first and second score vectors may be combined into a combined score vector 45. It will be appreciated that the first and second score vector may be combined with a variety of combination operations. For example, the combination operation may consist of adding the feature score vectors in an entry-wise manner for each candidate boundary position. FIG. 7 illustrates an example combined score vector 45, which was generated by combining the edge feature score vector 42 and the weighted color difference score vector 44. The combined score vector 45 represents a likelihood of observing a road boundary at each candidate position in the first region of interest 54A. In one embodiment, the boundary detection module 46 may determine that a boundary has been detected if a candidate boundary position has value in the combined score vector 45 that is greater than a threshold value. It will be appreciated that a variety of suitable threshold values may be used.

The boundary detection process described above may be iterated for each region of interest, such as the second region of interest 54B and all subsequent regions of interest. In the example illustrated in FIGS. 3-7, a first iteration of the process described above may detect a first detected boundary at candidate boundary position 56A (see FIG. 4) and a second detected boundary at candidate boundary position 56B. Similarly, a second iteration of the process for the second region of interest 54B may include determining a third detected boundary by examining a weighted color difference score vector of a third pair of regions of interest on either side of a third candidate boundary position 56C. It will be appreciated that the road boundary is not likely to drastically change over a short period of time. Accordingly, the third detected boundary corresponding to the third candidate boundary position 56C illustrated in FIG. 4, is likely to be located in approximately the same column as the first detected boundary corresponding to candidate boundary position 56A. Thus, in one embodiment, the positioning of the third candidate boundary position may be based upon the first detected boundary.

Likewise, the second iteration of the process for the second region of interest 54B may also include determining a fourth detected boundary by examining a weighted color difference score vector of a fourth pair of regions of interest on either side of a fourth candidate boundary position 56D, the positioning of the fourth candidate boundary position being based upon the second detected boundary.

Additionally, the road boundary tracking system 10 may be configured to determine the location of candidate boundary positions (and, by extension, detected boundary positions) in later images in a video sequence based on the position of the detected boundary in earlier images in the video sequence. Thus, after receiving a first image and processing it to output a first detected boundary as described above, the processor 18 may be configured to receive a second image from the camera. It will be understood that the second image is a subsequent frame in a video stream after the first image. The second image may be transformed via inverse perspective mapping, and color clustering may be performed on the second image as well, like the first image. The boundary detection module 46 may be configured to determine a detected boundary in the second image based on a pair of regions of interest (ROIs) positioned on each side of a candidate boundary position in the second image, wherein the candidate boundary position in the second image is at least partially based upon a position of the first detected boundary. For example, the boundary detection module 46 may be begin performing analysis of candidate boundary positions in the vicinity of (e.g., within 0-5%, and in some cases within a 1% horizontal offset of) the position of the first detected boundary, and may cease processing additional candidate boundary positions for the second image when a local peak in the weighted color difference score vector 44 (or combined score vector 45) is found, rather than performing analysis for all possible candidate boundary positions across the entire second image, to save processing resources. In yet another embodiment, the values in the combined score vector 45 may be weighted higher for candidate boundary positions that are in the vicinity of the first detected boundary, and lower for candidate boundary positions that are positioned far away from the position of the first detected boundary. In yet another embodiment, a Kalman filter or a particle filter may be used to estimate a position of a boundary in a current frame (i.e., the second frame in the example above) based on the position of a detected boundary from a previous frame (i.e., the first frame in the example above). In this way, the continuity of the detected boundary positions from frame to frame may be enhanced.

Figure 8:
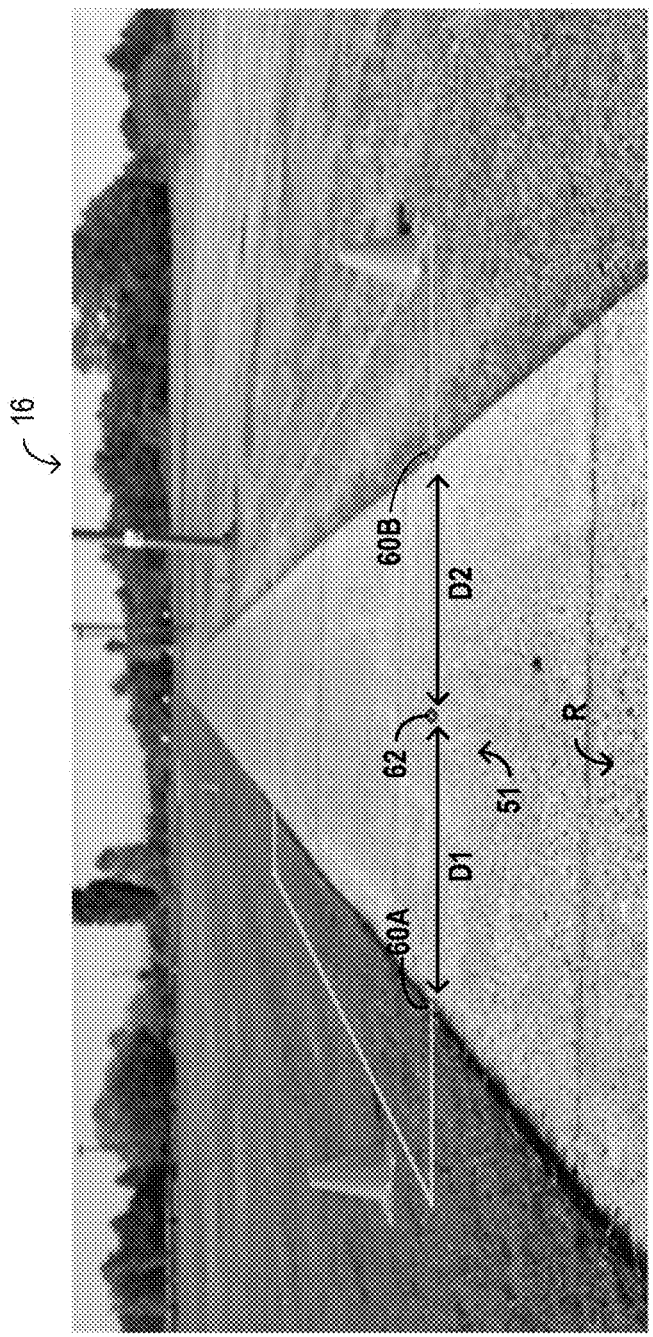
FIG. 8 shows an example lateral offset value for the image captured by the camera of FIG. 1.

Now turning to FIG. 8, the detected boundary is further determined based upon a lateral offset 51 of the position of the camera relative to its position on the road at an earlier time instant. In the example illustrated in FIG. 8, the processor 18 has detected left boundary 60A and right boundary 60B according to the methods described above. It will be noted that the illustrated boundary box indicates the portion of the captured image 16 to which inverse perspective mapping is applied to produce a top-down image. The two detected boundaries 60A, 60B may be sent to a lateral offset module 50 (see FIG. 2) executed by the processor 18. As the camera 14 has a known position on the vehicle 18, the lateral offset module may be configured to determine that the camera 14 has a camera lateral position 62 relative to the road R. Thus, the lateral offset module 50 may be configured to estimate a lateral offset 51 of the camera 14 relative to its position on the road at a specific time instant during the tracking process, such as upon detection of the left boundary 60A and the right boundary 60B. Furthermore, feature score vectors 42, 44 computed by the boundary detection module may also be sent to the lateral offset module. The lateral offset module 50 may also be configured to estimate the lateral offset between the position of the vehicle at one time instant and its position at an earlier time instant. To estimate such a relative lateral offset from one time instant to another time instant, the lateral offset module may apply a template matching or cross-correlation technique on the basis of the received score vectors. The estimated relative lateral offset value may be provided to the navigation module 52. The navigation module may use that offset value to maintain a given lateral position of the vehicle on the road.

In the example illustrated in FIG. 8, the lateral offset 51 may be defined by a first distance D1, which is the distance between the camera position 62 and the left boundary 60A, and a second distance D2, which is the distance between the camera position 62 and the right boundary 60B. The processor 18 may be configured to use this lateral offset 51 to determine future boundaries along the road. For example, the boundary detection module 46 may be configured to receive a lateral offset 51, and be further configured to determine the detected boundary 48 based on the lateral offset 51. In one embodiment, to determine the detected boundary 48 based on the lateral offset 51, the boundary detection module 46 may be configured to give a greater weight to the scores of candidate boundary positions that correspond to (e.g., are within a predetermined range of) the value of the lateral offset 51. In another embodiment, if the boundary detection module 46 is unable to determine a boundary based on the edge feature score vector 42 and the weighted color difference score vector 44, then the boundary detection module 46 (or alternatively the lateral offset module 50 itself) may be configured to determine that the boundary is located at a position calculated based on the lateral offset 51. It will be appreciated that the road boundary is not likely to drastically change over a short period of time. Accordingly, the lateral offset 51 may be an accurate estimation of where a next boundary will be after detection of a first boundary. This may be particularly useful for intervals of time over which the system loses track of either a left or right edge tracked using the other techniques described herein, for example. When such tracking is lost temporarily, the system may rely upon an estimated boundary position calculated based on the lateral offset 51 from the position 62.

Figure 9:
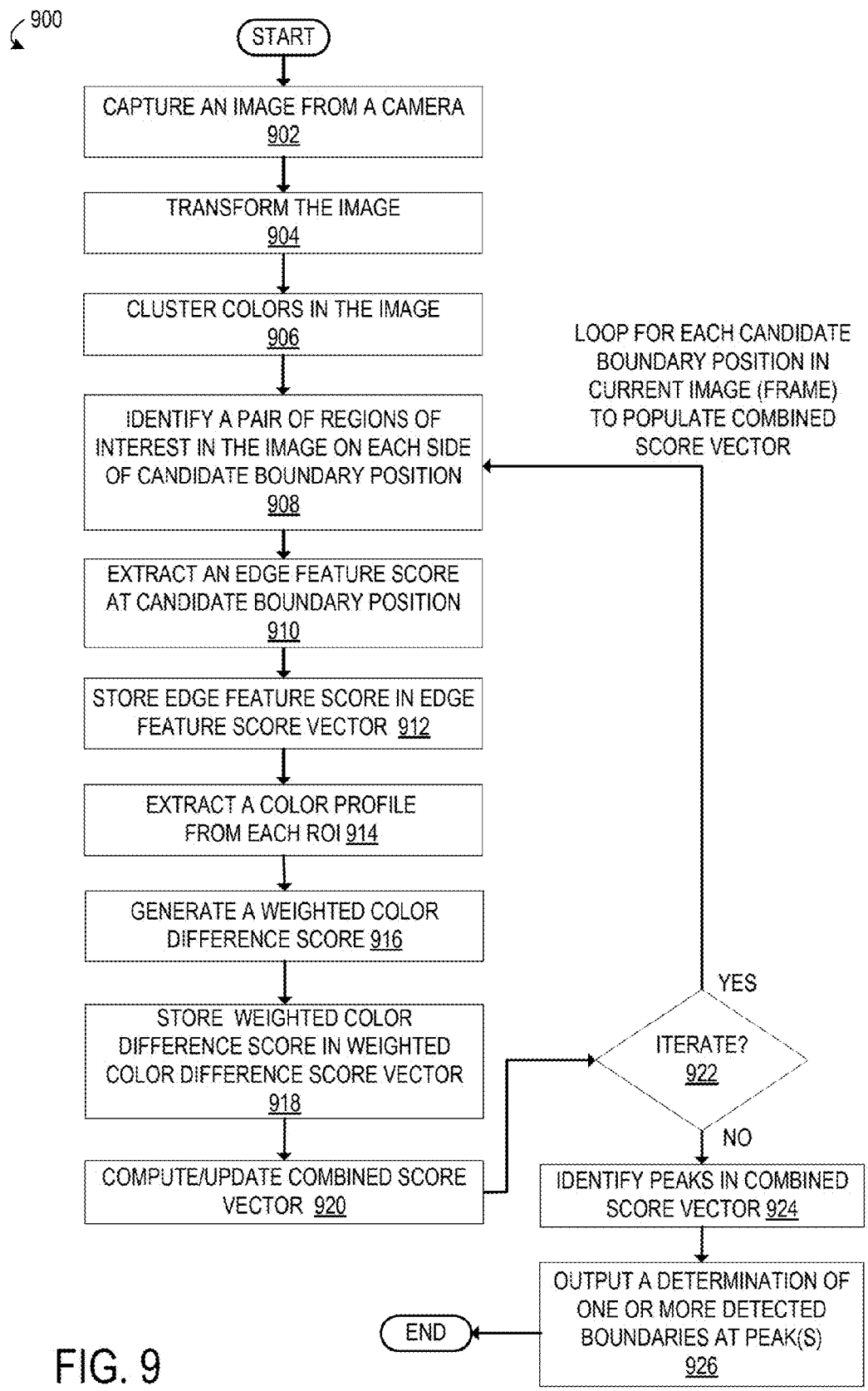
FIG. 9 shows a method for tracking a road boundary according to an embodiment of the present description.

FIG. 9 shows a flow chart of a method 900 of tracking a road boundary according to one embodiment of the present disclosure. At step 902, the method 900 may include capturing an image from a camera. In one embodiment, the camera is positioned onboard a vehicle. In another embodiment, the camera is positioned onboard a robot. The image typically includes a roadway and is captured from a perspective of camera mounting position on the vehicle or robot.

Proceeding from step 902 to step 904, the method 900 may include transforming the captured image using inverse-perspective image mapping, to transform the captured image from the perspective of the camera to a top view. This step occurs prior to identifying the pair of regions of interest at 908, discussed below.

Advancing from step 904 to step 906, the method 900 may include clustering the colors in the image, for example using the k-means clustering techniques described above. The image may include a plurality of segments, such as pixels or pixel groups, each segment having an associated luminance value and chrominance value. The clustering of the colors may include, for each segment in the plurality of segments, classifying the segment according to its chrominance value into one of a plurality of chrominance ranges. At 908, the method 900 may include identifying a pair of regions of interest (ROI) in the image on each side of a candidate boundary position. The candidate boundary position may be determined as described above.

Proceeding from step 908 to step 910, the method 900 may include extracting an edge feature score at the candidate boundary position from the image. The edge feature may be represented by data indicating an edge feature score, as described above, with higher values indicating a greater degree of confidence that an edge is present in at the candidate boundary position. In one embodiment, the edge feature is extracted based upon grayscale information of a part of the image that contains the pair of ROIs. At 912, the method may include storing the edge feature score in an edge feature vector, which is configured to contain a plurality of edge feature scores for a sequence of candidate boundary positions, as described above.

Advancing from step 912 to step 914, the method 900 may include extracting a color profile from each of the ROIs. The color profile may be extracted by identifying clustered colors from the clustering step at 906 in a part of the image that contains the pair of ROIs.

Proceeding from step 914 to step 916, the method 900 may include generating a weighted color difference score vector by comparing the color profiles and weighting a difference between the color profiles based on a color similarity between colors in the color profiles. In one embodiment, each color profile includes a respective color histogram which represents the clustered colors in each ROI of the pair of ROIs. At 918, the method may include storing the weighted color difference score for the candidate boundary position in a weighted color difference score vector configured to store weighted color differences scores for a sequence of candidate boundary positions. At 920, the method may include computing or updating a combined score vector. This is typically accomplished by combining the values for each candidate boundary position in the edge feature score vector with the values for the candidate boundary position in the weighted color difference score vector, to thereby produce a combined score vector having a combined score for each candidate boundary position.

At 922, the method includes determining whether to iterate for a next candidate boundary position. It will be appreciated that typically steps 908 through 920 are looped through in sequence for each of a plurality of eligible candidate boundary positions in the current image to populate the combined score vector. Thus, as described above, the edge feature score, weighted color difference score, and combined score for the candidate boundary position for a first iteration and a plurality of other edge feature scores, weighted color difference scores, and combined scores for other candidate boundary positions in the image calculated in subsequent iterations are stored in the edge feature score vector, the weighted color difference score vector, and the combined score vector, respectively. In some cases, the set of candidate boundary positions in the current image to be analyzed in the loop may be limited based upon information such as the location of the detected boundary in a previous frame, etc. In other cases, all pixels in a horizontal row across the image are analyzed as candidate boundary positions, as described above. If any eligible candidate boundary position remains to be iteratively analyzed, then the method proceeds to 908 from 920 (YES at 922), but if none remains, then the method proceed to 924 (NO at 922).

Thus, it will be appreciated that as the method iterates, the detected boundary may be a first detected boundary, and the method 900 may further include identifying a second pair of regions of interest (ROI) in the image on each side of a second candidate boundary position, extracting a second color profile from each of the ROIs, generating a second weighted color difference score vector by comparing the second color profiles and weighting a second difference between the second color profiles based on a second color similarity between colors in the second color profiles, and outputting a second determination of a second detected boundary based upon the second weighted color difference score vector. It will be appreciated that the same similarity matrix S, discussed above, may be used as the first color similarity and the second color similarity.

Advancing from step 916 to step 924, the method 900 may include outputting a determination of a detected boundary based upon the weighted color difference score vector. As shown at 924, the detected boundary may be determined by identifying a peak in the combined score vector. In some embodiments, the peak may be identified instead in the weighted color difference score vector. If desired, the detected boundary is determined by filtering the combined score vector (if edge featuring scoring is used) or directly filtering the weighted color difference score vector (if edge feature scoring is not used) to remove values above a threshold prior to identifying peaks in the score vector. Thus, it will be appreciated that in one alternative embodiment, when edge featuring scoring is not used, steps 910, 912, 920 may be omitted and the peaks may be identified from the weighted color difference score vector generated at 918. In another embodiment, the detected boundary is further determined based upon a lateral offset of the camera relative to its position on a road at a start of the image. In another embodiment, the detected boundary is a first boundary at an edge of a path or roadway.

It will be understood that the particular iterative processing strategy shown in FIG. 9 is merely illustrative, and that other processing strategies are also possible. For example, parallel processing techniques may be employed to determine the edge feature score vector 42 and weighted color difference score vector 44 in parallel. Further, nested iteration strategies may be employed in which a group of candidate boundary positions is first examined to determine edge feature scores, and then is examined to determine color difference scores. The methods described herein may be implemented by these or other alternative strategies.

Another embodiment of method 900 may include (step 902) capturing an image from a camera, (step 908) identifying a pair of regions of interest (ROI) in the image on each side of a candidate boundary position, (step 914) extracting a color profile from each of the ROIs, wherein extracting the color profile includes using inverse-perspective image mapping to (step 904) transform the captured image, (step 916) generating a weighted color difference score vector by comparing a difference between the color profiles based on a color similarity between colors in the color profiles, and (step 924) outputting a determination of a detected boundary based upon the weighted color difference score vector.

Figure 10:
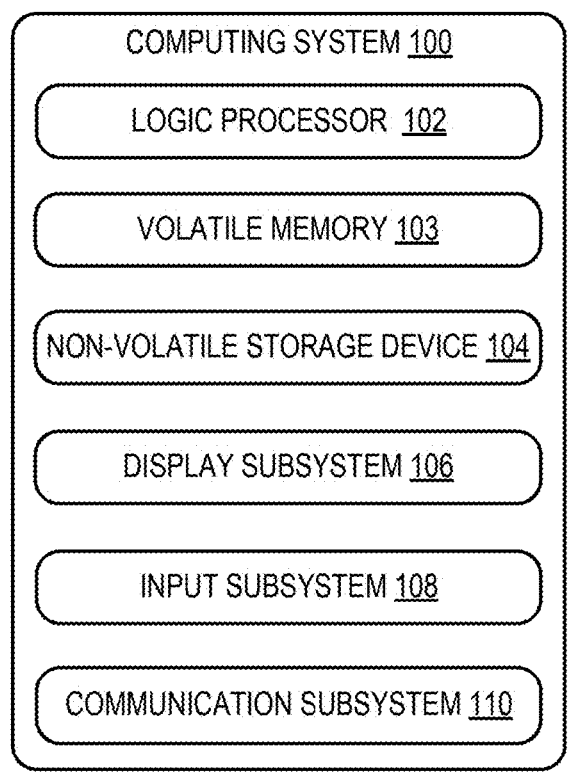
FIG. 10 shows an example computing system on which the embodiments of the present description may be implemented.

FIG. 10 illustrates an exemplary computing environment that may be used to implement the onboard computing system 12 and other computer systems and methods described herein. Computing system 100 is shown in simplified form. Computing system 100 may take the form of the onboard computing system 12, or one or more devices cooperating with the onboard computing system 12 (e.g., personal computers, server computers, tablet computers, network computing devices, mobile computing devices, mobile communication devices (e.g., smart phone), and/or other computing devices).

Computing system 100 includes a logic processor 102 volatile memory 103, and a non-volatile storage device 104. Computing system 100 may optionally include a display subsystem 106, input subsystem 108, communication subsystem 110, and/or other components not shown in FIG. 10. Display 20 illustrated in FIGS. 1 and 2 may be a part of display subsystem 106.

Logic processor 102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 102 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 104 includes one or more physical devices configured to hold instructions executable by the logic processors to implement the methods and processes described herein. When such methods and processes are implemented, the state of non-volatile storage device 104 may be transformed—e.g., to hold different data.

Non-volatile storage device 104 may include physical devices that are removable and/or built-in. Non-volatile storage device 104 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 104 may include nonvolatile, dynamic, static, read/write, read-only, sequential-access, location-addressable, file-addressable, and/or content-addressable devices. It will be appreciated that non-volatile storage device 104 is configured to hold instructions even when power is cut to the non-volatile storage device 104.

Volatile memory 103 may include physical devices that include random access memory. Volatile memory 103 is typically utilized by logic processor 102 to temporarily store information during processing of software instructions. It will be appreciated that volatile memory 103 typically does not continue to store instructions when power is cut to the volatile memory 103.

Aspects of logic processor 102, volatile memory 103, and non-volatile storage device 104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 100 implemented to perform a particular function. In some cases, a module, program, or engine may be instantiated via logic processor 102 executing instructions held by non-volatile storage device 104, using portions of volatile memory 103. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 106 may be used to present a visual representation of data held by non-volatile storage device 104. This visual representation may take the form of a graphical user interface (GUI). As the herein described methods and processes change the data held by the non-volatile storage device, and thus transform the state of the non-volatile storage device, the state of display subsystem 106 may likewise be transformed to visually represent changes in the underlying data. Display subsystem 106 may include one or more display devices utilizing virtually any type of technology. Such display devices may be combined with logic processor 102, volatile memory 103, and/or non-volatile storage device 104 in a shared enclosure, or such display devices may be peripheral display devices. In one example, the display subsystem 106 may be include the display 20, and may be mounted inside the vehicle V as part of a navigation aid system.

When included, input subsystem 108 may comprise or interface with one or more user-input devices such as a keyboard, mouse, or touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition. In one example, input subsystem 108 may include camera 14.

When included, communication subsystem 110 may be configured to communicatively couple computing system 100 with one or more other computing devices. Communication subsystem 110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 100 to send and/or receive messages to and/or from other devices via a network such as the Internet. In one example, communication subsystem 110 may be configured to send the navigation data 15B from the onboard computing device 12 to a server device.

The above described systems and methods may be advantageously utilized in various applications, including autonomous vehicle navigation. An autonomous vehicle can use road boundary information determined by the methods described above to steer itself in a target direction along a road. Also, a vehicle can use this information to stay on the road and to stay away from the road boundary, as the area outside of the road is generally less drivable than the road itself.

Road boundary information determined by the methods described above can also be used for road mapping applications. For example, a vehicle equipped with a camera and/or other sensors can be driven along a road under operator control specifically for the purpose of recording measurements and creating an accurate map database, including such information as the width of the road, which may be included in the road boundary information.

The method for road boundary tracking of the present description is designed to handle paved and unpaved roads, and can be used for lane detection as well. One embodiment uses inverse perspective mapping (IPM) to transform input frames from a forward looking camera into bird's eye view (BEV) frames. This significantly reduces complexity of subsequent detection and tracking steps, as several processing steps essentially collapse from 2D operations to 1D operations. This embodiment may also specify region-of-interests, which further reduces processing and reduces search space for road boundary candidates.

The use of color features as well as edge features determined from grayscale or luminosity enables the methods described above to operate in a wide variety of conditions, including paved roads but also unpaved paths and trails that do not always show clear road edges. Relying upon a color appearance contrast feature, rather than color directly, to help determine the boundary locations, increases robustness of the methods.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of tracking a road boundary, comprising:
capturing a color image from a camera;
identifying a pair of regions of interest (ROI) in the color image on each side of a candidate boundary position;
extracting a color profile from each of the ROIs;
generating a weighted color difference score by comparing the color profiles and weighting a difference between the color profiles based on a color similarity between colors in the color profiles; and
outputting a determination of a first detected boundary based upon the weighted color difference score; and
wherein the road boundary need not be painted to be detected.

2. The method of claim 1, wherein the camera is positioned onboard a vehicle.

3. The method of claim 1, wherein the camera is positioned onboard a robot.

4. The method of claim 1, further comprising:
extracting an edge feature score at the candidate boundary position from the color image.

5. The method of claim 4, wherein the edge feature score is extracted based upon grayscale information of a part of the color image that contains the pair of ROIs.

6. The method of claim 1, further comprising:
transforming the captured color image using inverse-perspective color image mapping prior to identifying the pair of regions of interest.

7. The method of claim 1, wherein extracting the color profile includes identifying clustered colors in a part of the color image that contains the pair of ROIs.

8. The method of claim 7, wherein the color image includes a plurality of segments, each segment having an associated luminance value and chrominance value, and wherein the colors are clustered by, for each segment in the plurality of segments, classifying the segment according to its chrominance value into one of a plurality of chrominance ranges.

9. The method of claim 1, wherein each color profile includes a respective color histogram which represents the clustered colors in each ROI of the pair of ROIs, and the weighted color difference score represents a dissimilarity in the respective color histograms.

10. The method of claim 1, wherein the weighted color difference score for the candidate boundary position and a plurality of other weighted color difference scores for other candidate boundary positions in the color image are stored in a weighted color difference score vector, and the detected boundary is determined by identifying a peak in the weighted color difference score vector.

11. The method of claim 10, wherein the detected boundary is determined by filtering the weighted color difference score to remove values above a threshold prior to identifying the peak.

12. The method of claim 1, wherein the first detected boundary is at an edge of a path or roadway.

13. The method of claim 1, wherein the detected boundary is a first detected boundary, and the method further comprises:
identifying a second pair of regions of interest (ROI) in the color image on each side of a second candidate boundary position;
extracting a second color profile from each of the ROIs of the second pair;
generating a second weighted color difference score by comparing the second color profiles and weighting a second difference between the second color profiles based on a second color similarity between colors in the second color profiles; and
outputting a second determination of a second detected boundary based upon the second weighted color difference score.

14. The method of claim 1, wherein the color image is a first color image, the method further comprising:
capturing a second color image from a camera, the second color image being a subsequent frame in a video stream to the first color image;
transforming the second color image via inverse perspective mapping;
performing color clustering on the second color image; and
determining a detected boundary in the second color image based on a pair of regions of interest (ROIs) positioned on each side of a candidate boundary position in the second color image, wherein the candidate boundary position in the second color image is at least partially based upon a position of the first detected boundary.

15. The method of claim 1, wherein the detected boundary is further determined based upon a lateral offset of the camera position relative to its position at an earlier time instant.

16. A road boundary tracking system, comprising:
a camera for capturing an color image; and
a processor configured to:
extract an edge feature at a candidate boundary position from the color image;
identify a pair of regions of interest (ROI) in the color image on each side of the candidate boundary position;
extract a color profile from each of the ROIs;
generate a weighted color difference score by comparing the color profiles, and weighting a difference between the color profiles based on a color similarity between colors in the color profiles; and
output a determination of a detected boundary based upon the weighted color difference score and the extracted edge feature; and
wherein the road boundary need not be painted to be detected.

17. The road boundary tracking system of claim 16, wherein the processor extracts the color profile by identifying clustered colors in a part of the color image that contains the pair of ROIs.

18. The road boundary tracking system of claim 16, wherein each color profile includes a respective color histogram which represents the clustered colors in each ROI of the pair of ROIs, and the weighted color difference score represents a dissimilarity in the respective color histograms.

19. The road boundary tracking system of claim 16, comprising:
an onboard computing system which includes the camera and the processor, and wherein the processor is further configured to execute a navigation module to receive the output and control travel of a vehicle based upon the output.

* * * * *